United States Patent Office 3,325,360
Patented June 13, 1967

3,325,360
PYRIMIDINE-DI-ONE PHARMACEUTICAL COMPOSITIONS HAVING ANTI-INFLAMMATORY ACTIVITY
Frank M. Berger, Princeton, Friedrich Dürsch, Freehold, and Bernard J. Ludwig, North Brunswick, N.J., assignors to Carter Products Inc., New York, N.Y., a corporation of Maryland
No Drawing. Filed Nov. 25, 1963, Ser. No. 325,813
6 Claims. (Cl. 167—65)

The present invention relates to novel pharmaceutical compositions useful for relieving inflammation when administered systemically to warm blooded animals. In another aspect, this invention relates to a novel method of relieving inflammation in warm blooded animals. In a further aspect, the invention relates to novel compounds which possess unique anti-inflammatory activity.

Accordingly, one or more of the following objects will be attained by the practice of the present invention.

It is an object of the invention to provide novel compositions having unique anti-inflammatory properties. It is another object of the invention to provide a method for relieving inflammation in warm blooded animals. It is a further object of the invention to provide novel compounds having unique anti-inflammatory activity. These and other objects will become apparent to one skilled in the art in the light of the instant specification.

It has been found that some of the objects of the invention can be realized by providing a pharmaceutical composition comprising, as an active ingredient thereof, a pharmaceutically effective amount of a 1-aralkyl-hexahydropyrimidine-2,4-dione of the general formula:

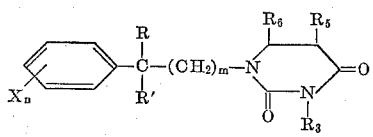

wherein each X is selected from the group consisting of halogen, lower alkyl, lower alkoxy and trifluoromethyl; $n$ is an integer having a value from 0 to 5; R and R' are selected from the group consisting of hydrogen, lower alkyl, phenyl and aralkyl; $m$ is an integer having a value from 0 to 4; and $R_3$, $R_5$ and $R_6$ are selected from the group consisting of hydrogen and lower alkyl. As used herein and in the appended claims, the terms "lower alkyl" and "lower alkoxy" indicate radicals which contain from one to about six carbon atoms.

In general, the 1-aralkyl-hexahydropyrimidine-2,4-diones useful as active ingredients in the novel pharmaceutical compositions of the present invention can be prepared by the reaction of a primary aralkyl amine of the formula:

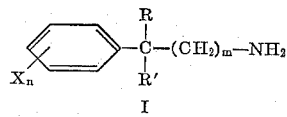

wherein X, $n$, R, R' and $m$ are as hereinbefore defined, with an ester of acrylic acid, such as an alkyl acrylate, to form a derivative of alkyl 3-aminopropionate of the formula:

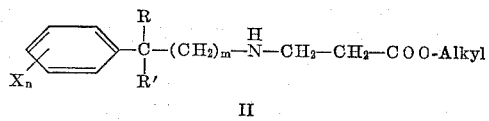

Intermediate II is then treated with cyanic acid to form a further intermediate of the formula:

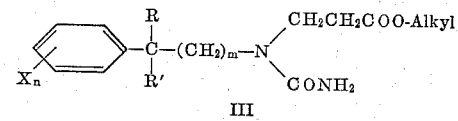

Intermediate III is subsequently saponified with aqueous alkali and cyclized under the influence of a mineral acid to the 1-aralkyl-hexahydropyrimidine-2,4-dione of the formula:

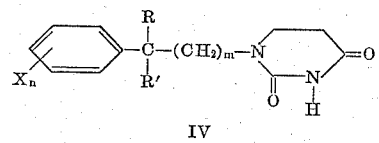

The compounds obtained by the reaction scheme outlined above are 1-aralkyl-hexahydropyrimidine-2,4-diones which contain no alkyl substituents on the hexahydropyrimidine ring, i.e., compounds wherein $R_3$, $R_5$ and $R_6$ of the general formula are hydrogen.

To prepare the 1-aralkyl-3-alkyl-hexahydropyrimidine-2,4-dione, the corresponding 1-aralkyl-hexahydropyrimidine-2,4-dione (IV) can be alkylated, preferably as the sodium salt, with appropriate alkyl halide in a dimethyl formamide medium. Alternatively, the 1-aralkyl-3-alkyl-hexahydropyrimidine-2,4-dione can be obtained by reacting intermediate II with the appropriate isocyanic ester $R_3NCO$ to form an intermediate which is subsequently hydrolyzed and cyclized as described above.

The 1-aralkyl-5-alkyl-hexahydropyrimidine-2,4-diones of the present invention can be prepared by reacting a primary aralkylamine (I) with the alkyl ester of an appropriate α-alkylacrylic acid $CH_2=CR_5COO$-alkyl to form an intermediate of the formula:

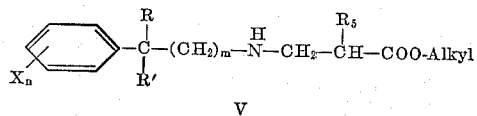

Intermediate V is subsequently reacted with cyanic acid and the resulting intermediate is hydrolyzed and cyclized in the sequence described above to give the desired product.

Alternately, the 5-alkyl compound can be prepared by carrying out a Mannich condensation with a primary aralkylamine (I), formaldehyde, and an appropriately substituted malonic acid $R_5CH(COOH)_2$ to obtain an intermediate of the formula:

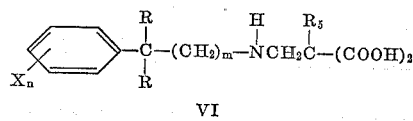

Intermediate VI is subsequently reacted with cyanic acid and the resulting intermediate is hydrolyzed and cyclized as described above.

The 1-aralkyl-3,5-dialkyl-hexahydropyrimidine-2,4-diones can be prepared by alkylation of the 5-alkyl compound obtained as indicated above with an appropriate alkyl halide. Alternately, the 3,5-dialkyl compound can be obtained by reacting intermediate V or VI with an appropriate isocyanic ester $R_3NCO$ and then hydrolyzing and cyclizing the resulting product as indicated above.

The 1-aralkyl-6-alkyl-hexahydropyrimidine-2,4-diones can conveniently be prepared by the reaction of a primary aralkylamine (I) with the alkyl ester of an appropriate β-alkylacrylic acid $R_6CH=CH—COO$-alkyl to give an intermediate of the formula:

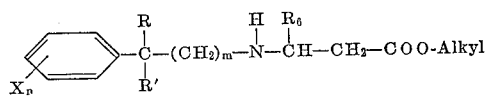

VII

Alternately, the same intermediate VII can be obtained by the reaction of a primary aralkylamine with the alkyl ester of an appropriate acylacetic acid $R_6COCH_2COO$-alkyl, followed by catalytic hydrogenation of the resulting enamine.

The desired 6-alkyl compound is obtained by reacting the above intermediate VII with cyanic acid and by hydrolyzing and cyclizing the resulting intermediate.

The desired 1-aralkyl-3,6-dialkyl-hexahydro-pyrimidine-2,4-diones can be prepared by the alkylation of the 6-alkyl compounds obtained as indicated above with the appropriate alkyl halide. Alternately, they may be prepared by reacting intermediate VII with an alkyl isocyanate $R_3NCO$ followed by hydrolysis and cyclization as indicated above.

The desired 1-aralkyl-5,6-dialkyl-hexahydropyrimidine-2,4-diones can be prepared by the reaction of a primary aralkylamine (I) with an appropriate alkyl ester of an acylacetic acid $R_6COCH(R_5)COO$-alkyl, followed by catalytic hydrogenation of the resulting enamine to an intermediate of the formula:

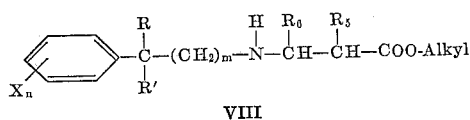

VIII

The desired 5,6-dialkyl compounds can be obtained by reacting the above intermediate VIII with cyanic acid and by hydrolyzing and cyclizing the resulting products as indicated above.

The desired 1-aralkyl-3,5,6-trialkyl-hexahydro-pyrimidine-2,4-diones can be prepared by the alkylation of the 5,6-dialkyl compounds obtained as indicated above with the appropriate alkyl haldies. Alternately, the 3,5,6-trialkyl compounds may be prepared by reacting the intermediate VIII with an alkyl isocyanate $R_3NCO$ followed by hydrolysis and cyclization of the resulting product as indicated above.

Illustrative compounds which are operable in the practice of the present invention and which were prepared by the above-described procedure are set forth in Table I, which follows.

TABLE I

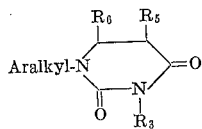

| No. | Aralkyl | $R_3$ | $R_5$ | $R_6$ |
|---|---|---|---|---|
| 1 | Benzyl | H | H | H. |
| 2 | β-Phenethyl | H | H | H. |
| 3 | δ-Phenylbutyl | H | H | H. |
| 4 | α-Pentylbenzyl | H | H | H. |
| 5 | Benzhydryl | H | H | H. |
| 6 | 4-ethyl-α-phenethyl | H | H | H. |
| 7 | 4-isopropylbenzyl | H | H | H. |
| 8 | 3,4-dimethylbenzyl | H | H | H. |
| 9 | 2,4,5-trimethylbenzyl | H | H | H. |
| 10 | 4-methoxybenzyl | H | H | H. |
| 11 | 3,4-dimethoxybenzyl | H | H | H. |
| 12 | 2-fluorobenzyl | H | H | H. |
| 13 | 4-fluorobenzyl | H | H | H. |
| 14 | 4-fluoro-α-phenethyl | H | H | H. |
| 15 | 4-bromobenzyl | H | H | H. |
| 16 | 3-iodobenzyl | H | H | H. |
| 17 | 4-chlorobenzyl | H | H | H. |
| 18 | 3-chloro-α-phenethyl | H | H | H. |
| 19 | 4-chloro-β-phenethyl | H | H | H. |
| 20 | 4-chloro-α-ethylbenzyl | H | H | H. |
| 21 | 2-(4-chlorophenyl)isobutyl | H | H | H. |
| 22 | 2,4-dichlorobenzyl | H | H | H. |
| 23 | 2,6-dichlorobenzyl | H | H | H. |
| 24 | 3,4-dichlorobenzyl | H | H | H. |
| 25 | 3,4-dichloro-α-phenethyl | H | H | H. |
| 26 | 3,4-dichloro-α-isopropylbenzyl | H | H | H. |
| 27 | 3,4-dichloro-α-butylbenzyl | H | H | H. |
| 28 | 3,4-dichlorobenzhydryl | H | H | H. |
| 29 | 3,4,3',4'-tetrachloro-benzhydryl | H | H | H. |
| 30 | 3,4-dichloro-α-(β-phenethyl)-benzyl | H | H | H. |
| 31 | 3-chloro-4-methylbenzyl | H | H | H. |
| 32 | 3-trifluoromethylbenzyl | H | H | H. |
| 33 | Benzyl | Ethyl | H | H. |
| 34 | do | Isobutyl | H | H. |
| 35 | do | Pentyl | H | H. |
| 36 | 2-chlorobenzyl | Ethyl | H | H. |
| 37 | Benzyl | H | Methyl | H. |
| 38 | do | H | Propyl | H. |
| 39 | β-Phenethyl | H | Methyl | H. |
| 40 | 4-chlorobenzyl | H | Propyl | H. |
| 31 | 3,4-dichlorobenzyl | H | Methyl | H. |
| 42 | 3,4-dichlorobenzyl | H | Propyl | H. |
| 43 | 3,4-dichloro-α-phenethyl | H | Methyl | H. |
| 44 | Benzyl | Methyl | do | H. |
| 45 | 3,4-dichlorobenzyl | do | do | H. |
| 46 | 4-chloro-α-ethylbenzyl | Ethyl | H | H. |
| 47 | Benzyl | H | H | Methyl. |
| 48 | 3,4-dichlorobenzyl | H | H | Do. |
| 49 | 4-chloro-α-phenethyl | H | H | Do. |
| 50 | Benzyl | H | Butyl | Do. |
| 51 | 3,4-dichlorobenzyl | H | do | Do. |
| 52 | do | Methyl | H | Do. |
| 53 | do | Ethyl | Butyl | Do. |

While, in general, all the 1-aralkyl-hexahydro-pyrimidine-2,4-diones hereinbefore described are effective active ingredients in the novel pharmaceutical compositions of the present invention, the preferred compounds are novel compounds of the general formula:

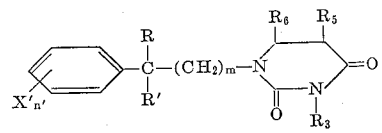

wherein R, R', $R_3$, $R_5$, $R_6$, and m are as hereinbefore defined; n' is an integer having a value from 1 to 5 and each X' is selected from the group consisting of halogen and lower alkyl, and at least one X' is halogen. Particularly preferred are compounds wherein at least one X' represents chlorine.

The procedure by which the anti-inflammatory activity of the compositions of this invention was evaluated will now be discussed. The test employed for determining such activity was the conventionally-used "kaolin method" described by Hillebrecht in Arzneimittel-Forschung, 9, 625–628, 1959. In this method, the inflammation is produced by injection of 0.05 ml. of a 10% kaolin suspension subcutaneously in the upper planar surface of the rat foot. The drugs to be evaluated are administered intraperitoneally 60 minutes before the kaolin injection and 60 minutes after the kaolin injection. Five hours after the injection, the volume of the kaolin-injected foot is compared with the volume of the control-injected foot for each individual rat. The compounds to be evaluated were administered in various doses and six rats were used for each dose of the compound tested.

To compute the anti-inflammatory value of the test drug, the volume of the control foot is subtracted from the volume of the inflamed foot. The volume differences of the rats in each dose group are summed, averaged, and the standard error of the mean calculated. The $ED_{50}$ value is obtained by plotting the percent of inhibition of inflammation against the logarithm of the dose. Such $ED_{50}$ value, expressed in mg. of active ingredient per kg. of rat, is the effective dose which will inhibit inflammation in 50% of the group animals tested and is a measure of the anti-inflammatory activity of the compound tested. Table II, which follows, sets forth the anti-inflammatory activities of a representative number of the 1-aralkyl-hexahydro-pyrimidine-2,4-diones of the present invention, as determined by means of the kaolin method.

TABLE II

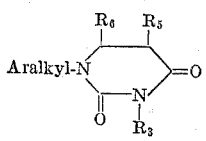

| No. | Aralkyl | $R_3$ | $R_5$ | $R_6$ | $ED_{50}$ |
|---|---|---|---|---|---|
| 1 | Benzyl | H | H | H | 72 |
| 7 | 4-isopropylbenzyl | H | H | H | 120 |
| 8 | 3,4-dimethylbenzyl | H | H | H | 120 |
| 11 | 3,4-dimethoxybenzyl | H | H | H | 140 |
| 13 | 4-fluorobenzyl | H | H | H | 135 |
| 14 | 4-fluoro-α-phenethyl | H | H | H | 74 |
| 15 | 4-bromobenzyl | H | H | H | 144 |
| 17 | 4-chlorobenzyl | H | H | H | 145 |
| 19 | 4-chloro-β-phenethyl | H | H | H | 97 |
| 20 | 4-chloro-α-ethylbenzyl | H | H | H | 105 |
| 22 | 2,4-dichlorobenzyl | H | H | H | 62 |
| 24 | 3,4-dichlorobenzyl | H | H | H | 125 |
| 25 | 3,4-dichloro-α-phenethyl | H | H | H | 35 |
| 32 | 3-trifluoromethylbenzyl | H | H | H | 140 |
| 33 | Benzyl | Ethyl | H | H | 115 |
| 37 | do | H | Methyl | H | 97 |
| 41 | 3,4-dichlorobenzyl | H | H | H | 110 |
| 42 | do | H | Propyl | H | 90 |
| 43 | 3,4-dichloro-α-phenethyl | H | Methyl | H | 120 |
| 44 | Benzyl | Methyl | do | H | 100 |

The pharmaceutical compositions of the present invention are prepared by incorporating the active ingredient with a suitable pharmaceutical carrier. The carrier must be of such nature that the novel compositions may be administered systemically to warm blooded animals. The term "systemically," as used herein, means a mode of administration whereby the active ingredient, when given to warm blooded animals, is effective in the whole body and not merely at the locus application. This includes both oral administration and administration by injection.

The active ingredients of the present invention are preferably administered orally in the form of tablets or capsules. The preferred carrier for a given active ingredient depends upon the nature of said ingredient. For example, a liquid active ingredient is preferably administered in the form of a soft gelatin capsule containing a therapeutic dose of the active ingredient. A solid active ingredient is preferably administered in the form of tablets or capsules. Suitable solid pharmaceutical carriers which can be utilized include, for example, starch, lactose, sucrose, glucose, gelatin, and the like. When the composition is in the form of a solid, the active ingredient is generally in an amount of from about 25 to about 95% by weight of the total composition.

The active ingredients of the invention can also be dissolved in a liquid pharmaceutical carrier, such as, for example, propylene glycol, polyethylene glycol, water, saline, and mixtures thereof, to form a solution suitable for injection. Such injectable solutions generally contain from about 0.1 gram to about 90 grams of active ingredient per 100 ml. of solution.

The following examples illustrate the preparation of a representative number of the active ingredients of the present invention.

EXAMPLE I 1-(2-fluorobenzyl)hexahydropyrimidine-2,4-dione (Compound 12).—A mixture of 10.2 g. of 2-fluorobenzylamine, 7.0 g. of methyl acrylate, and 50 ml. of methanol was refluxed for six hours. The methanol was distilled and the residue was fractionated in vacuo. 16.7 g. of pure methyl β-(2-fluorobenzylamino)propionate was obtained, B.P. 79–82°/0.1 mm., $n_D^{25}$ 1.4965. 14.0 g. of this intermediate was dissolved in a mixture of 100 ml. of water and 5.5 ml. of conc. hydrochloric acid. A solution of 5.4 g. of potassium cyanate in 20 ml. of water was added and the mixture was kept overnight at room temperature. 2.8 g. of solid sodium hydroxide was added and the mixture was heated for four hours on a steam bath. The resulting clear solution was acidified with 10 ml. of conc. hydrochloric acid and heating was continued for four hours. After cooling the mixture, the precipitate which separated was removed by filtration. Recrystallization from 500 ml. of methanol furnished 11.5 g. of the desired compound, M.P. 184–185°.

EXAMPLE II

Preparation of 1-(3,4-dichloro-α-phenethyl)hexahydropyrimidine-2,4-dione (Compound 25).—52.2 g. of methyl acrylate was added dropwise with stirring to a solution of 114.8 g. of 3,4-dichloro-α-phenethylamine in 300 ml. of methanol. The mixture was kept for two hours at room temperature and was subsequently refluxed for five hours. The methanol was distilled and the residue was fractionated in vacuo. 142 g. of pure methyl β-(3,4-dichloro-α-phenethylamino) propionate was obtained, B.P. 138°/0.07 mm., $n_D^{25}$ 1.5297.

A solution of 2.8 g. of potassium cyanate in 10 ml. of water was added to a solution of 9.5 g. of the above described propionate ester in 69 ml. of 0.5 N hydrochloric acid. An oil separated rapidly which solidified after standing overnight at room temperature. The solid was separated and was recrystallized from methanol to give 10.2 g. of pure N-(3,4-dichloro-α-phenethyl)-N-(β-carbomethoxyethyl)urea, M.P. 123–125°.

A slurry of 10.2 g. of the urea from above in 33 ml. of 1.0 N sodium hydroxide solution was heated on a steam bath for three hours. A clear solution resulted which was acidified with hydrochloric acid to pH 1. Heating was continued for two more hours. The mixture was cooled and the precipitate that had formed was filtered. 5.2 g. of pure 1-(3,4-dichloro-α-phenethyl)hexahydropyrimidine-2,4-dione were thus obtained, M.P. 158–159°, unchanged upon recrystallization from methanol.

EXAMPLE III

Preparation of 1-(2-chlorobenzyl)-3-ethylhexahydropyrimidine-2,4-dione (Compound 36).—A solution of 2.34 g. of sodium metal in 150 ml. of methanol was combined with 24.3 g. of 1-(2-chlorobenzyl)hexahydropyrimidine-2,4-dione. The mixture was refluxed briefly and the methanol was distilled. The solid residue of the sodium salt of the starting material was dissolved in 200 ml. of dimethyl formamide and 15.9 g. of ethyl iodide was added to the solution. The mixture was heated on a steam bath for three hours and most of the solvent was subsequently removed by vacuum distillation. The residue was diluted with water and the resulting suspension was extracted with ether. The ether was washed with cold sodium hydroxide solution and with water until neutral and was dried over sodium sulfate. The ether was removed and the oily residue was purified by molecular distillation at a bath temperature of 120/0.001 mm. 16.8 g. of the desired compound was obtained, $n_D^{25}$ 1.5611.

EXAMPLE IV

Preparation of 1-(3,4-dichlorobenzyl)-5-methylhexahydropyrimidine-2,4-dione (Compound 41).—A mixture of 88 g. of 3,4-dichlorobenzylamine, 100 ml. of methyl methacrylate, and 100 ml. of methanol was refluxed for 15 hours. The methanol was distilled and the residue was fractionated in vacuo. 44.2 g. of pure methyl β-(3,4-dichlorobenzylamino)-α-methylpropionate of B.P. 132–135°/0.1 mm., $n_D^{25}$ 1.5310, were obtained.

This intermediate was dissolved in a mixture of 250 ml. of water and 13.3 ml. of conc. hydrochloric acid. An aqueous solution of 13.0 g. of potassium cyanate was added and the mixture was kept overnight at room temperature. The mixture was heated to boiling and 6.7 g.

of solid sodium hydroxide was added. A clear solution was formed. Heating was continued for one hour when 30 ml. of conc. hydrochloric acid was added slowly with stirring. An oily precipitate was formed which solidified after standing for two hours at 80°. The mixture was cooled and the solid was filtered. Recrystallization from 150 ml. of methanol furnished 34.0 g. of the desired compound, M.P. 131–132°.

EXAMPLE V

*Preparation of 1-(3,4-dichlorobenzyl)-5-propylhexahydropyrimidine-2,4-dione*

(Compound 42).—A solution of 10.0 g. of propylmalonic acid in 350 ml. of water was stirred vigorously while 12.1 g. of 3,4-dichlorobenzylamine was added dropwise. A fine precipitate separated. Subsequently, 6.9 ml. of 35% aqueous formaldehyde was added and the mixture was stirred for 24 hours at room temperature. The solid was filtered and washed with water yielding 15.5 g. of 2-propyl-2-(3,4-dichlorobenzylaminomethyl)malonic acid, M.P. 143–144°.

A solution of 11.3 g. of the substituted malonic acid from above in 340 ml. of 0.1 N sodium hydroxide was combined with a solution of 2.7 g. of potassium cyanate in 150 ml. of water. The mixture was kept for two days at room temperature and was then filtered from a small amount of precipitate. The filtrate was acidified with 16 ml. of conc. hydrochloric acid. A precipitate separated and the mixture was heated for three hours on a steam bath. The resulting slurry was cooled and an excess of potassium carbonate was added slowly with stirring. The precipitate was filtered and washed thoroughly with water. Recrystallization from 50% methanol afforded 1.6 g. of the desired compound, M.P. 124–125°. Acidification of the aqueous filtrate from above precipitated 5.1 g. of unchanged starting material which can be recovered for further use in the same reaction.

EXAMPLE VI

*Preparation of 1-(4-chloro-α-ethylbenzyl)-3-ethylhexahydropyrimidine-2,4-dione*

(Compound 46).—A mixture of 160 g. of 4-chloro-α-ethylbenzylamine, 81 g. of methyl acrylate, and 400 ml. of methanol was heated to reflux for six hours. The methanol was removed and the residue was fractionated under reduced pressure. 223 g. of methyl N-(4-chloro-α-ethylbenzyl)-β-aminopropionate was obtained, B.P. 125–129°/0.07 mm., $n_D^{25}$ 1.5127.

A solution of 7.1 g. of ethyl isocyanate in 50 ml. of ether was added slowly to a solution of 25.6 g. of the above described aminopropionate in 50 ml. of ether. A white precipitate formed. The mixture was stirred at room temperature for three hours and the precipitate was isolated. 21.8 g. of pure methyl N-(4-chloro-α-ethylbenzyl)-N-carbamoyl-β-aminopropionate was obtained, M.P. 111–113°.

A mixture of 21.6 g. of this compound and 66 ml. of 1.0 N aqueous sodium hydroxide was heated on a steam bath for two hours. The turbid mixture was acidified to about pH 1 with concentrated hydrochloric acid and heating was continued for three more hours. The mixture was cooled to room temperature and the solid which separated was isolated. Recrystallization from methanol furnished 13.4 g. of the desired compound, M.P. 110–111°.

EXAMPLE VII

*Preparation of 1-(3,4-dichlorobenzyl)-3,5-dimethylhydropyrimidine-2,4-dione*

(Compound 45).—To a sodium methylate solution prepared from 0.44 g. of sodium metal and 40 ml. of methanol was added 5.45 g. of 1-(3,4-dichlorobenzyl)-5-methylhexahydropyrimidine-2,4-dione. The mixture was stirred at room temperature until a clear solution resulted. This solution was evaporated to dryness at room temperature and the solid residue was dissolved in 60 ml. of N,N-dimethylformamide. To this was added 2.7 g. of methyl iodide and the mixture was heated to 50° C. for two hours. The mixture was poured into 250 ml. of water and the turbid solution extracted with ether. The ether solution was washed with dilute sodium hydroxide solution and with water until neutral. The ether was evaporated and the oily residue was distilled using a molecular distillation unit. 4.2 g. of the desired compound was collected at 125°/0.001 mm.

EXAMPLE VIII

*Preparation of 1-(3,4-dichlorobenzyl)-6-methylhexahydropyrimidine-2,4-dione*

(Compund 48).—A mixture of 40.5 g. of 3,4-dichlorobenzylamine, 40.0 g. of ethyl acetoacetate, and 125 ml. of benzene was heated to reflux under a Dean-Stark trap. 4.0 ml. of water collected within 30 minutes. The benzene and the excess acetoacetate were distilled. The residue consisting of 65 g. of ethyl β-(3,4-dichlorobenzylamino)crotonate was hydrogenated in an ethanol-acetic acid mixture over a platinum catalyst. The hydrogenation was complete after 90 minutes. The mixture was filtered and the ethanol was distilled. The residue was dissolved in water and excess of cold dilute sodium hydroxide solution was added. An oil separated which was extracted with ether. The ether solution was dried and distilled, yielding 52.3 g. of ethyl β-(3,4-dichlorobenzylamino)butyrate, B.P. 125–128°/0.05 mm., $n_D^{25}$ 1.5215.

A solution of 29.0 g. of the above compound in 250 ml. of water and 8.4 ml. of conc. hydrochloric acid was prepared and a solution of 8.1 g. of potassium cyanate was added. A lumpy solid separated upon standing overnight. The mixture was heated to boiling for 30 minutes and 4.0 g. of solid sodium hydroxide added. Heating was continued for two hours and an excess of hydrochloric acid was added. Heating was continued for three more hours and the mixture cooled to room temperature. The solid which separated was filtered and washed with water. The crude produce was recrystalized from methanol to yield 13.4 g. of the desired product.

The following are examples of tablets and solutions formed in accordance with the present invention:

EXAMPLE A

A tablet is compressed from a composition having the following formula:

| | Mg. |
|---|---|
| 1-(4-fluorobenzyl)hexahydropyrimidine-2,4-dione | 100 |
| Corn starch | 50 |
| Magnesium stearate | 2 |
| Alginic acid | 8 |

EXAMPLE B

A tablet is compressed from a composition having the following formula:

| | Mg. |
|---|---|
| 1 - (3,4-dichloro-α-phenethyl)hexahydropyrimidine-2,4-dione | 100 |
| Corn starch | 30 |
| Magnesium stearate | 1 |
| Alginic acid | 8 |
| Gum acacia | 10 |

EXAMPLE C

A tablet is compressed from a composition having the following formula:

| | Mg. |
|---|---|
| 1 - (3,4-dichlorobenzyl)-5-propylhexahydropyrimidine-2,4-dione | 100 |
| Corn starch | 50 |
| Magnesium stearate | 2 |
| Alginic acid | 8 |

EXAMPLE D

An injectable solution is prepared by dissolving 5 g. of 3,4-dichloro-α-phenethylhexahydropyrimidine-2,4-dione in a suitable mixture of polyethylene glycol 300 and distilled water to a final volume of 100 ml. to give a 5% (w./v.) solution.

EXAMPLE E 200 mg. of 1-(3,4-dichlorobenzyl)-6-methylhexahydropyrimidine-2,4-dione is mixed with 0.5 cc. of corn oil and the resulting solution is encapsulated in a soft gelatin capsule.

Although the invention has been illustrated by the preceding examples, it is not to be construed as limited thereby. Various departures may be made therefrom within the scope of the accompanying claims without departing from the scope thereof.

We claim:
1. A method of relieving inflammation in a warm blooded animal which comprises administering systematically to said animal in an amount sufficient to relieve inflammation a 1-aralkyl-hexahydropyrimidine-2,4-dione of the general formula:

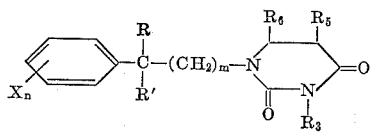

wherein each X is selected from the group consisting of halogen, lower alkyl, lower alkoxy and trifluoromethyl; $n$ is an integer having a value from 0 to 5; R and R' are selected from the group consisting of hydrogen, lower alkyl, phenyl and phenethyl; $m$ is an integer having a value from 0 to 5; and $R_3$, $R_5$ and $R_6$ are selected from the group consisting of hydrogen and lower alkyl.

2. The method of claim 1 wherein the 1-aralkyl-hexahydropyrimidine-2,4-dione is 1-benzylhexahydropyrimidine-2,4-dione.

3. The method of claim 1 wherein the 1-aralkyl-hexahydropyrimidine-2,4-dione is 1-(3,4-dichloro-α-phenethyl)-hexahydropyrimidine-2,4-dione.

4. The method of claim 1 wherein the 1-aralkyl-hexahydropyrimidine-2,4-dione is 1-(4-fluoro-α-phenethyl)-hexahydroyrimidine-2,4-dione.

5. The method of claim 1 wherein the 1-aralkyl-hexahydropyrimidine-2,4-dione is 1-(2,4-dichlorobenzyl)-hexahydropyrimidine-2,4-dione.

6. The method of claim 1 wherein the 1-aralkyl-hexahydropyrimidine-2,4-dione is 1-(3,4-dichlorobenzyl)-5-propylhexahydropyrimidine-2,4-dione.

References Cited

UNITED STATES PATENTS 3,124,580  3/1964  Surrey et al. _____ 260—260
3,194,808  7/1965  Surrey et al. _____ 260—260

OTHER REFERENCES

Baltrusis et al., Chemical Abstracts, vol. 59, Cols. 8858–8859, Oct. 21, 1963.

Gearen et al., Journal of Organic Chemistry, vol. 23, pp. 491–492, 1958.

SAM ROSEN, *Primary Examiner.*

JULIAN S. LEVITT, *Examiner.*

LEROY B. RANDALL, *Assistant Examiner.*